(12) United States Patent
Lewendon

(10) Patent No.: US 10,518,883 B2
(45) Date of Patent: Dec. 31, 2019

(54) SMALL STORE SUSPENSION AND RELEASE UNIT

(71) Applicant: EDO MBM Technology Limited, Brighton (GB)

(72) Inventor: James Lewendon, Brighton (GB)

(73) Assignee: EDO MBM Technology Limited, Brighton (GB)

( * ) Notice: Subject to any disclaimer, the term of this patent is extended or adjusted under 35 U.S.C. 154(b) by 69 days.

(21) Appl. No.: 15/531,669

(22) PCT Filed: Nov. 26, 2015

(86) PCT No.: PCT/GB2015/053609
§ 371 (c)(1),
(2) Date: May 30, 2017

(87) PCT Pub. No.: WO2016/087822
PCT Pub. Date: Jun. 9, 2016

(65) Prior Publication Data
US 2018/0281952 A1 Oct. 4, 2018

(30) Foreign Application Priority Data

Dec. 1, 2014 (GB) .................................. 1421473.8

(51) Int. Cl.
*B64D 1/02* (2006.01)
*B64D 7/08* (2006.01)
(Continued)

(52) U.S. Cl.
CPC .................. *B64D 1/02* (2013.01); *B64D 1/06* (2013.01); *B64D 7/08* (2013.01); *F41F 5/00* (2013.01); *H01R 13/635* (2013.01)

(58) Field of Classification Search
CPC ... B64D 1/02; B64D 7/08; B64D 1/06; H01R 13/635; F41F 5/00
See application file for complete search history.

(56) References Cited

U.S. PATENT DOCUMENTS 2,856,224 A 10/1958 Kelly et al.
2,865,584 A * 12/1958 Holloway ................ B64D 1/04
244/137.4
(Continued)

FOREIGN PATENT DOCUMENTS

GB 1088571 10/1967
GB 2044898 10/1980

OTHER PUBLICATIONS

Korea Patent Application No. 10-2017-7018221, Office Action (including English translation), dated Apr. 10, 2018.
(Continued)

*Primary Examiner* — Stephen A Vu
(74) *Attorney, Agent, or Firm* — Kilpatrick Townsend & Stockton LLP; Dean W. Russell

(57) ABSTRACT

A small store suspension and release unit uses a resiliently biased electrical connector assembly and/or resiliently biased feet pivotally attached to adjustable sway brace legs to apply an ejection impulse to a store after release from a suspension hook. A safety latch mechanism includes a pawl which engages a nib on the suspension hook assembly to prevent inadvertent release of the store if the suspension hook assembly becomes jammed, e.g., due to ice formation.

19 Claims, 7 Drawing Sheets

(51) Int. Cl.
  *B64D 1/06*    (2006.01)
  *F41F 5/00*    (2006.01)
  *H01R 13/635*  (2006.01)

(56) References Cited

U.S. PATENT DOCUMENTS

| | | |
|---|---|---|
| 3,967,528 A | 7/1976 | Baker |
| 4,050,656 A | 9/1977 | Peterson |
| 4,257,639 A * | 3/1981 | Stock .................... B64D 7/08 |
| | | 244/137.4 |
| 4,313,582 A | 2/1982 | Hasquenoph et al. |
| 4,399,733 A | 8/1983 | Mick |
| 7,648,104 B1 | 1/2010 | Jakubowski, Jr. et al. |
| 8,052,444 B1 | 11/2011 | McMahon et al. |
| 2002/0088902 A1* | 7/2002 | Griffin .................... B64D 1/04 |
| | | 244/137.4 |

OTHER PUBLICATIONS

International Patent Application No. PCT/GB2015/053609, Search Report and Written Opinion, dated May 18, 2016.
United Kingdom Patent Application No. 1421473.8, Combined Search and Examination Report, dated Jun. 16, 2015.

* cited by examiner

SMALL STORE SUSPENSION AND RELEASE UNIT

CROSS REFERENCE TO RELATED APPLICATIONS

This patent application is the U.S. national stage entry of International Patent Application No. PCT/GB2015/053609, filed on Nov. 26, 2015, which application claims priority to United Kingdom Patent Application No. 1421473.8, filed on Dec. 1, 2014, the contents of both of which are incorporated herein by reference.

FIELD OF THE INVENTION

This invention concerns a suspension and release unit particularly (although not exclusively) for attaching small and relatively lightweight stores to the underside of an aircraft, for example beneath the wings, for release when desired.

BACKGROUND OF THE INVENTION

Conventional store suspension and release units for aircraft comprise sway braces used to hold the store steady during carriage in flight, and separate gas-powered pistons which push the store away from the aircraft at the moment of release, so that the store is ejected out of the aircraft slipstream in a controlled manner, along the correct trajectory, without risk of colliding with the aircraft. The size and mass of conventional stores makes such power assisted ejection necessary. The electrical interface between such suspension and release units and the store for arming, target programming and similar functions is provided by an umbilical cable with a releasable electrical connector at one end attached to the store. This allows the store to be mechanically attached to the suspension and release unit before the electrical connection is made up, making the relatively large and heavy conventional stores easier to load. However, such cables can cause additional drag during separation of the store from the aircraft, necessitating still higher ejection forces. Powered ejection systems and umbilical connector cables have therefore been found necessary for conventional stores, but are complex and expensive in both hardware and maintenance costs.

SUMMARY OF THE INVENTION

The present invention aims to reduce the complexity of the store suspension and release unit by eliminating the necessity for a separate ejector piston or the like. Accordingly, in one independent aspect, the present invention provides a suspension and release unit for an aircraft, as defined in claim 1. In a further independent aspect, the present invention provides a suspension and release unit for an aircraft, as defined in claim 10.

The suspension and release unit is thereby made structurally simpler, with either or both of the sway brace and electrical connector used to perform a dual function: in the case of the sway brace, both steadying the store during carriage and ejection upon release; and in the case of the electrical connector, electrical interfacing with the store and ejection upon release.

The sway brace (or a portion thereof) may be movable under resilient bias to provide the ejection impulse. Similarly, the electrical connector (or a portion thereof) may be movable under resilient bias to provide the ejection impulse.

Mechanical springs may be used to provide such resilient bias in a particularly straightforward way and are particularly effective in the case of smaller and lighter stores. However the sway brace (or a portion thereof) may additionally or alternatively be power actuated, e.g. by a gas powered piston or any other suitable means, to provide the ejection impulse. Similarly, the electrical connector (or a portion thereof) may additionally or alternatively be power actuated, e.g. by a gas powered piston or any other suitable means, to provide the ejection impulse. The sway brace may comprise a leg which is angularly adjustable for engagement with the store. The adjustment may be provided by a lead screw. The leg may be height adjustable with respect to a suspension and release hook of the suspension and release unit, to more readily accommodate stores of differing diameters. The leg may comprise a pivotally attached foot engageable with the store, the ejection impulse being provided by a torsion spring which biases at least a portion of the foot in a direction outwardly away from the remainder of the suspension and release unit.

The electrical connector may comprise one or more coil springs which bias at least a portion of the electrical connector in a direction away from the remainder of the suspension and release unit, to provide the ejection impulse.

In a yet further independent aspect, the present invention provides safety improvements in a latching mechanism of a store suspension and release unit. Typically, such units comprise a rotary solenoid actuated primary latch which is releasable to allow a store suspension hook to rotate under spring action and under the weight of the store, thereby releasing the store. The primary latch is mechanically interlinked with a safety latch, actuated by a separate rotary solenoid, so that it is necessary to energize the solenoids sequentially in order to release the hook for rotation. Under some conditions ice may form within the latching mechanism which may jam the suspension hook, preventing it from moving sufficiently to release the store upon actuation of the primary latch. However under such conditions parts of the primary latch may be free to move sufficiently to prevent them from lockingly re-engaging with the suspension hook and with the safety latch, after the solenoids have been de-energized. This leaves the latching mechanism in an unsafe condition, as once the ice has melted, the store can suddenly and unexpectedly be released.

In an independent aspect, the invention therefore provides a latching mechanism for a store suspension and release unit, comprising a primary latch which can be actuated to release a suspension hook for movement, thereby to release a store, and a safety latch movable from a locked position in which it lies in the path of movement of the suspension hook or of parts movable therewith so as to block movement of the suspension hook, to an unlocked position in which the safety latch lies clear of the path of movement whereby the suspension hook is free to move and release the store. Therefore in the event of the suspension hook becoming jammed against movement, e.g. through ice formation, the safety latch is able to move into the locked position to prevent movement of the suspension hook and release of the store, no matter whether or not the primary latch is able to re-engage the suspension hook.

Preferably in the locked position the safety latch is engageable with the primary latch to prevent actuation of the primary latch and in the unlocked position the safety latch allows actuation of the primary latch.

Preferably the safety latch is primarily actuated by a solenoid or similar electrically powered actuator.

Preferably the suspension hook comprises a nib engageable with the distal end of a store suspension lug as a store is offered up to the suspension hook, so as to rotate the suspension hook from a released position to a position in which the suspension hook engages the lug, the safety latch moving into the path of rotation of the nib.

Preferably the safety latch comprises an actuator driven rotary arm having a detent disengageable from the primary latch by operation of the actuator; the rotary arm being drivingly coupled to a detent pawl which is movable out of the path of rotation of the nib by operation of the actuator. The safety latch and primary latch mechanism can preferably be disengaged mechanically by means of a manual release override cam.

An illustrative suspension and release unit embodying the invention is described below with reference to the drawings, in which:

DETAILED DESCRIPTION

Figure 1:
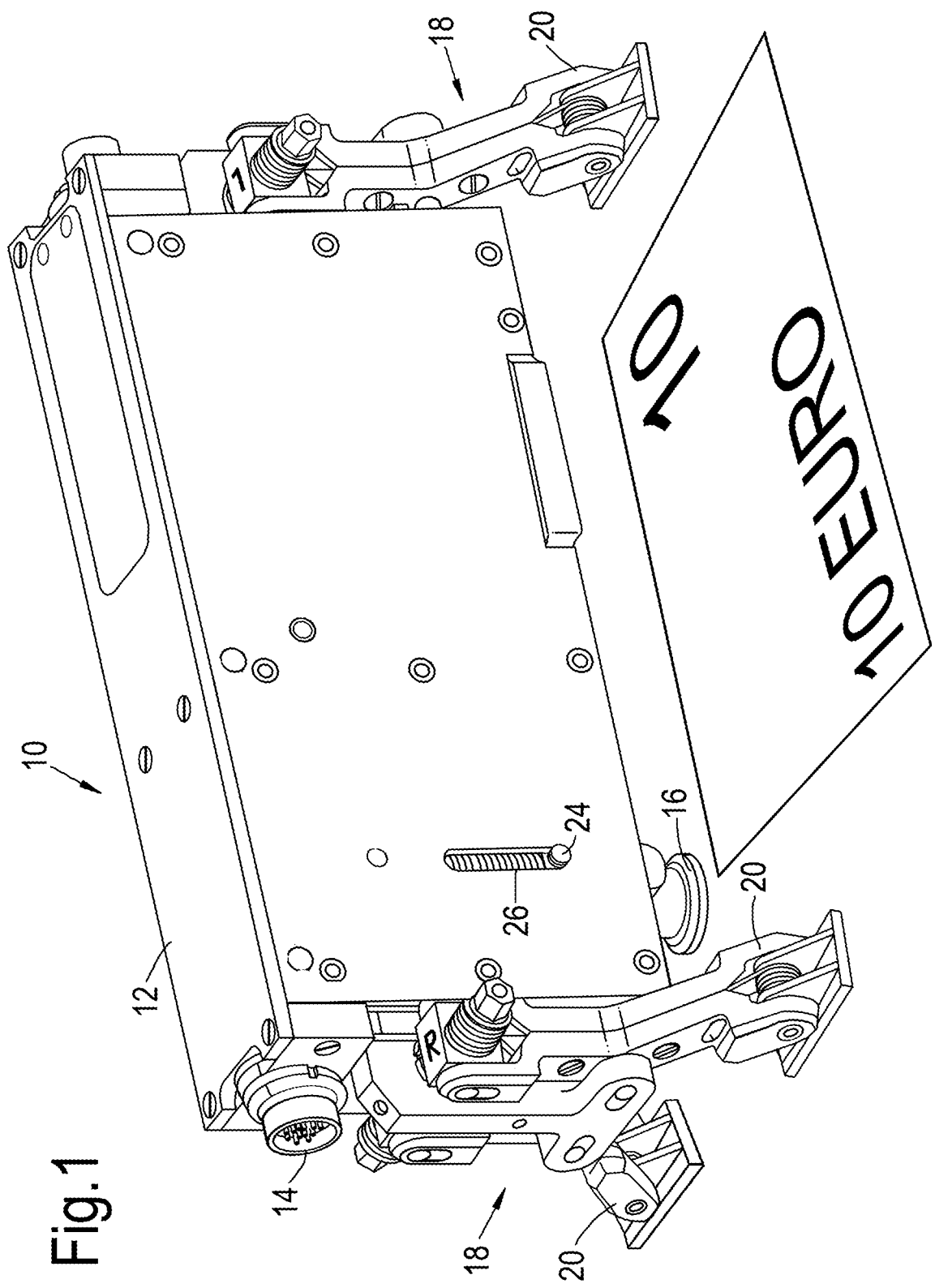
FIG. 1 shows a side perspective view of the illustrative suspension and release unit.

FIG. 1 shows the illustrative suspension and release unit 10 next to a ten Euro note, to provide an indication of scale. The unit 10 comprises a main body 12 for attachment to an aircraft, e.g. beneath a wing. The main body has a fixed electrical connector 14 for interfacing the suspension and release unit with the aircraft electrical systems, and a spring biased, movable electrical connector assembly 16 for interfacing with a store (not shown). The movable electrical connector assembly 16 is electrically connected to a fixed electrical connector 14 (FIG. 2) positioned at the opposite end of the main body 12 relative to the fixed electrical connector 14a. Mounted one at either end of the suspension and release unit 10, are respective sway brace assemblies 18. Each assembly comprises a pair of adjustable legs 20, described in more detail below.

Referring to FIGS. 1-5, the movable electrical connector assembly 16 comprises a movable crossbar 22. Reduced diameter ends 24 of the crossbar 22 are slidable in vertical guide slots 26 provided in the unit 10 side covers. A pair of vertical guide rods 28 are fixed to and move with the crossbar 22 and carry at their lower ends mountings 30 for an electrical coupling plug housing 32. Flexible printed circuit ribbon cables 33 and ribbon cable connector plugs 35 connect the electrical coupling plug in the housing 32 to the fixed electrical connector 14. Upper ends of the guide rods 28 are closely slidable in through bores provided in a fixed cross bar 34. Reduced diameter end portions 36 of the fixed cross bar 34 are fixedly received in holes drilled in the unit 10 side covers. A respective compression spring 38 is held captive on each guide rod 28, between the cross bars 22, 34. The springs 38 are schematically shown fully compressed in FIGS. 2-4, to expose a length of each guide rod 28. However normally the springs 38 will remain braced between the cross bars 22, 24 so that the movable cross bar 22, guide rods 28 and coupling plug housing 32 are biased downwardly. The guide rods 28 are held captive in the upper cross bar 34 guide bores by circlips 40 and the lower cross bar 22 outer ends are slidably captive in the unit side cover guide slots 26. During mounting of a store for carriage by the suspension and release unit 10, a complementary electrical connector socket (not shown) on the store is offered up for "blind mating" with the coupling plug in the housing 32. That is, the store and the electrical connector socket mounted on it are moved bodily into mating engagement with the coupling plug in the housing 32. The store suspension hook 102 within the unit 10 (described in further detail below) is mounted at a vertical level such that compression of the springs 38 is required, via the engaged electrical connector socket and coupling plug, in order to achieve mechanical engagement between the suspension hook and a corresponding suspension lug (not shown) on the store. The electrical coupling plug housing 32 is therefore resiliently biased or pre-loaded against the suspended store. When the suspension hook is released, the springs 38 are free to expand, thereby providing an impulse propelling the coupling plug housing and the store downwardly away from the body 12 of the suspension and release unit 10. When the movable electrical connector assembly 16 reaches its maximum extension, gravity and the momentum of the downwardly moving store (assisted if necessary by spring loading or other biasing of sway brace components as further described below) will cause the electrical coupling plug within the housing 32 to pull out of the store socket. The store is thereby completely released from the suspension and release unit 10 and travels away from the aircraft along a controlled trajectory.

Now referring additionally to FIGS. 6-10, it can be seen that each leg 20 of each sway brace mechanism 18 comprises a pair of machined components 20a, 20b having a central bend to form a shallow V shape. The two components of each pair are substantially mirror images of one another and are secured back to back by machine screws 42. Upper ends of the components are outwardly cranked away from each other to form upper forks 44 for the reception of drive nuts 46. Lower ends of the components are similarly outwardly cranked to form lower forks 48 in which feet 50 are pivotally mounted. Trunnions 52 on the drive nuts 46 are received in slots 54 in the forks 44 to connect the upper ends of the legs 20 to the drive nuts 46 (see FIG. 6). Pivot pins 56 mounted across the lower forks 48 pass through vertical webs 58 of the associated foot 50 to pivotally mount it to the leg lower end (see FIGS. 4 and 6).

Centre pivot pins 60 passing through each leg 20 have an outer end received in a guide slot 62 provided in a centre bracket 64. Inner ends of the centre pivot pins 60 are received in respective C-shaped recesses 66 provided in the adjacent end faces of the body 12 (see FIGS. 6 and 7). The respective centre brackets 64 of the two sway brace assemblies are provided one at either end of the body 12 to which they are slidably attached in the same manner. Each bracket comprises a pair of parallel, horizontally inwardly projecting, mounting and guide shafts 72 which are a close sliding fit in a pair of axially aligned guide slots 68, 70 provided in the ends of the body 12. Inner ends of the mounting and guide shafts 72 project through the guide slots 68, 70 into the body 12 interior. Washers 74 and circlips 76 are fitted about the shaft 72 inner ends to hold the centre bracket 64 captive but vertically slidable in the guide slots 68, 70 (see FIGS. 5, 6, 6*a* and 7).

The inner face of the bracket 64 has a spacer 78 secured to it by a machine screw 80. A torsion spring 82 is mounted on the spacer 78 and has opposed arms braced in slots 84 formed in each leg 20 of the sway brace assembly 18. Each slot 84 is formed by abutting chamfered portions on the "knee" of the central bend in each of the components making up the leg 20 concerned. In this way, the two legs making up each sway brace assembly are resiliently biased away from each other, so that the centre pivot pins 60 are biased towards the outer ends of the centre bracket guide slots 62 and towards the outer ends of the limbs of the C-shaped recesses 66. Squeezing the legs of a given sway brace assembly 18 together against the bias of the torsion spring 82 causes each leg to pivot about the drive nut trunnions 52, so that the centre pivot pins 60 move inwardly along the guide slots 62. The inner ends of the centre pivot pins are thus disengaged from whichever limb of the C-shaped recess they were previously engaged in. The entire sway brace assembly 18 including the centre bracket 64 may then be slid up or down, whereupon on releasing the legs 20, the centre pivot pins 60 may engage in the other limbs of the C-shaped recesses 66. The sway brace assembly 18 may therefore be moved between two different vertical positions relative to the body 12 by squeezing the legs 20 together, and upon release of the legs is automatically locked in the position to which it has been moved.

Figure 9:
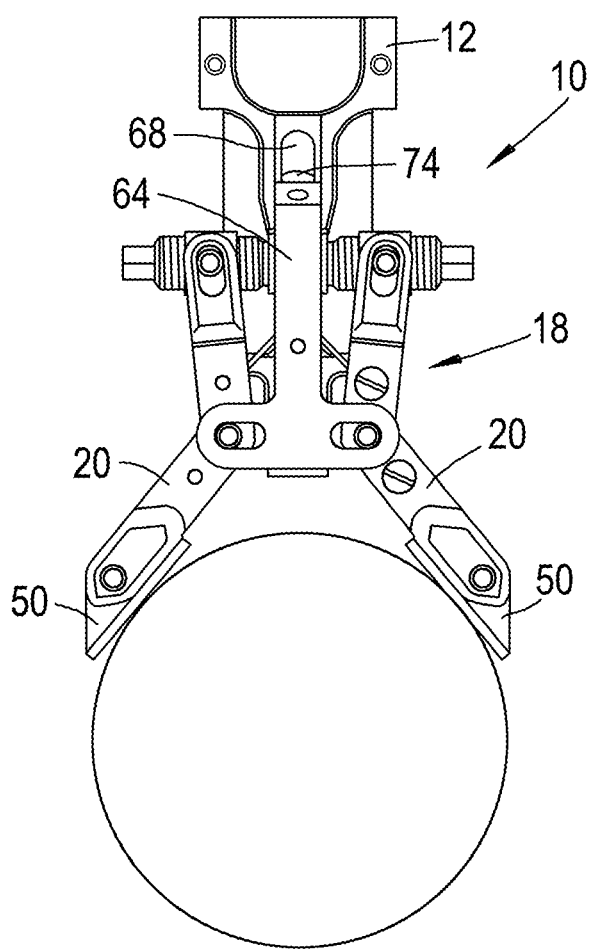
FIGS. 9 and 10 are end views showing the sway brace mechanism in lower and upper positions respectively, adjusted for engagement with schematically indicated small diameter and larger diameter stores respectively.
Figure 10:
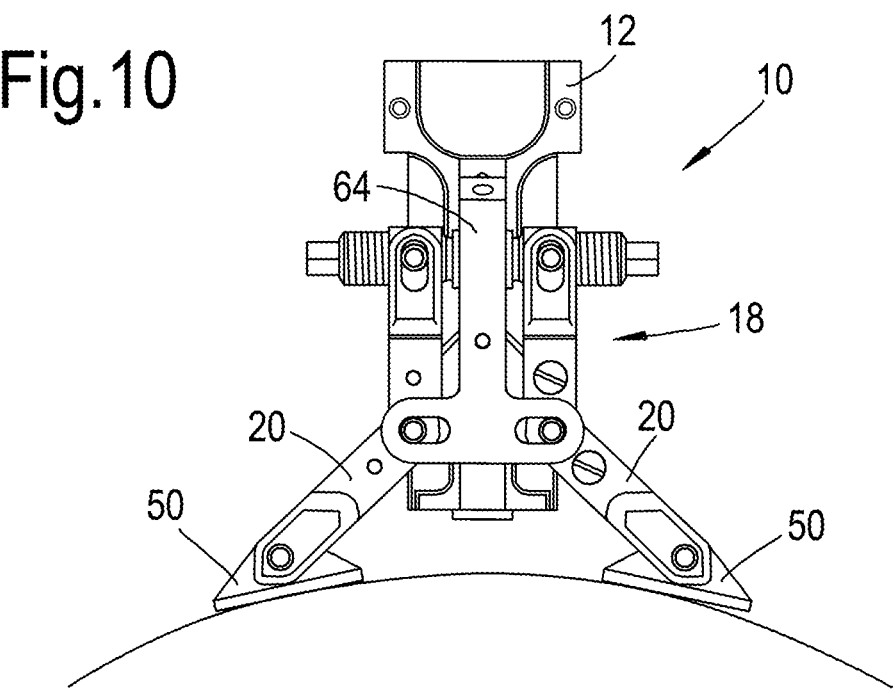

In the lower position, the feet 50 of the sway brace 18 are further below the coupling plug housing 32 than when the sway brace is in the upper position. As shown in FIGS. 9 and 10, the lower position is therefore more suitable for steeply curving (small diameter, e.g. down to 3 inch, 76.2 mm) store cross-sections; whereas the upper position is more suitable for more gently curving store cross-sections (larger diameters, e.g. up to 12 inches, 305 mm).

The centre bracket 64 also carries a bearing yoke 86 for a lead screw 88 having oppositely handed threads at each end. The drive nuts 46 are threadingly mounted one on each of these threads. The lead screw may be turned by a wrench or drive key fitted to hexagonal-sectioned end portions 90. A hollow grub screw 92 contains a spring loaded ball detent engageable in a series of pits 94 around the circumference of the lead screw 88, to prevent rotation of the lead screw in the bracket 64 under shock and vibration. With the sway braces set at the appropriate height for the store diameter, the store is blind mated to the electrical connector assembly 16 and engaged by the suspension hook 102. The sway braces 18 are then brought into firm engagement with the body of the store by turning the lead screw 88 to move the drive nuts 46 outwardly. The upper ends of the sway brace legs 20 are thus moved outwardly. The centre pivot pins 60 are constrained against vertical movement and against outward horizontal movement by the ends of the centre bracket slots 52 and of the C-shaped guide slots 66. The lower ends of the sway brace legs 20 thus move inwardly towards the store. When the sway brace legs 20 have been brought into firm engagement with the store, the centre pivot pins 62 cannot move along the guide slots 62 and the sway brace assemblies are therefore locked against up or down sliding movement, as the case may be.

Figure 8:
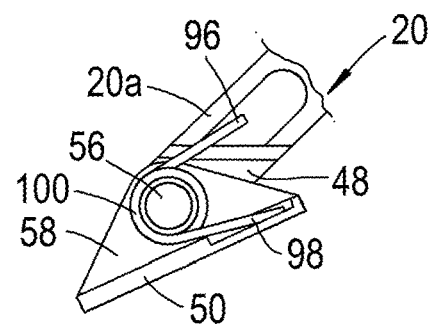
FIG. 8 is a detailed cross-sectional view showing a sway brace foot.

As shown in FIG. 8, each foot 50 pivot pin 56 carries a torsion spring 100 wrapped around it. One limb 96 of the torsion spring is trapped in a recess defined between the two components of the leg 20 and the other limb 98 of the torsion spring is received in a recess formed inside the base of the foot 50. In this way, the inner part of each foot is resiliently biased in a direction downwardly and outwardly away from the body 12 of the suspension and release unit 10. As the sway brace legs 20 are brought into firm engagement with the store as described above, the inner parts of the feet 50 are rotated upwardly towards the body 12 of the suspension and release unit 10, so as to preload the torsion springs 100. Upon release of the suspension hook from the store, the torsion springs 100 rotate the inner portions of the feet 50 downwardly and outwardly away from the suspension and release unit body 12, to provide an ejection impulse to the store, with a "flick" action.

Figure 2:
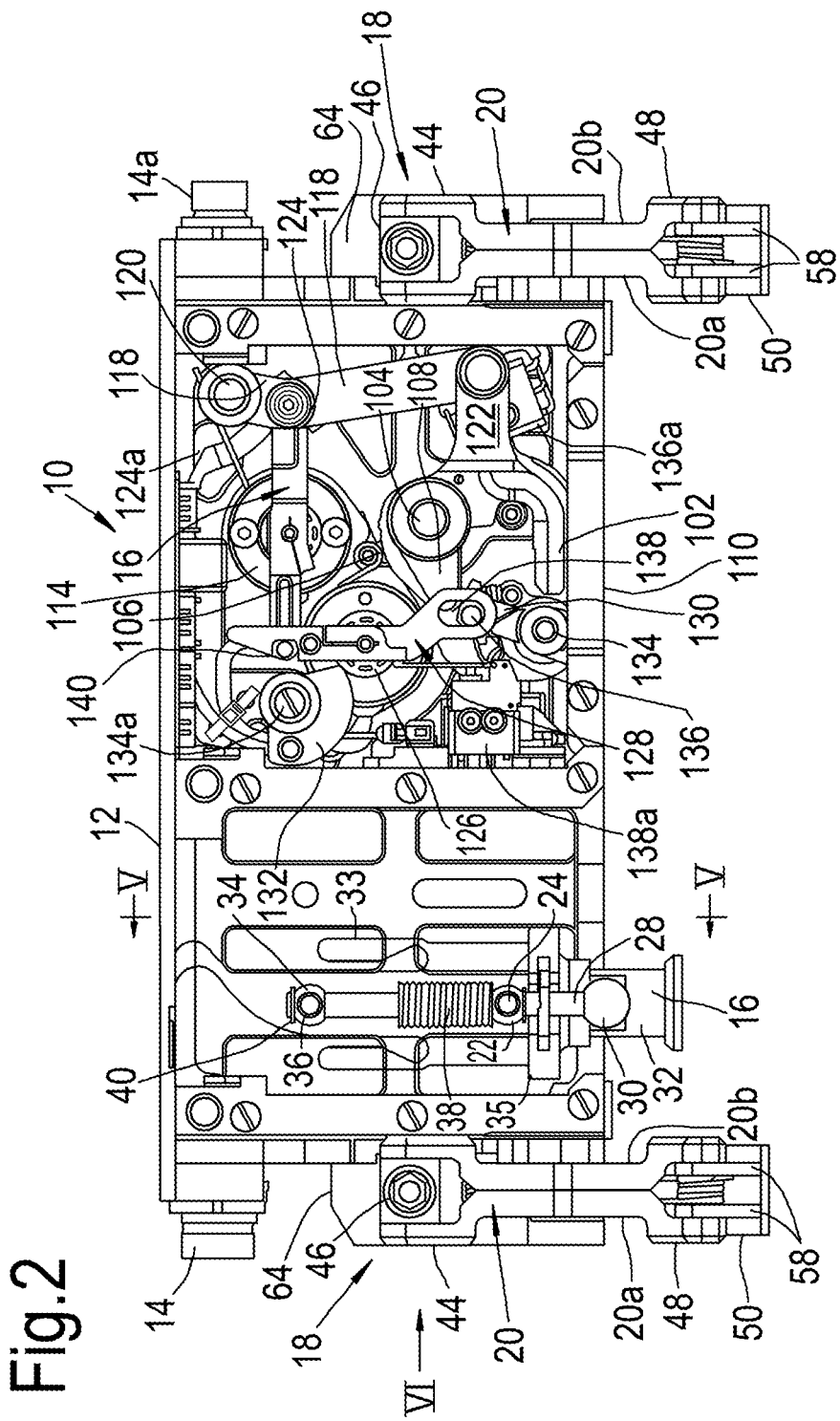
FIG. 2 is a side view of the suspension and release unit of FIG. 1 with a side cover removed.
Figure 3:
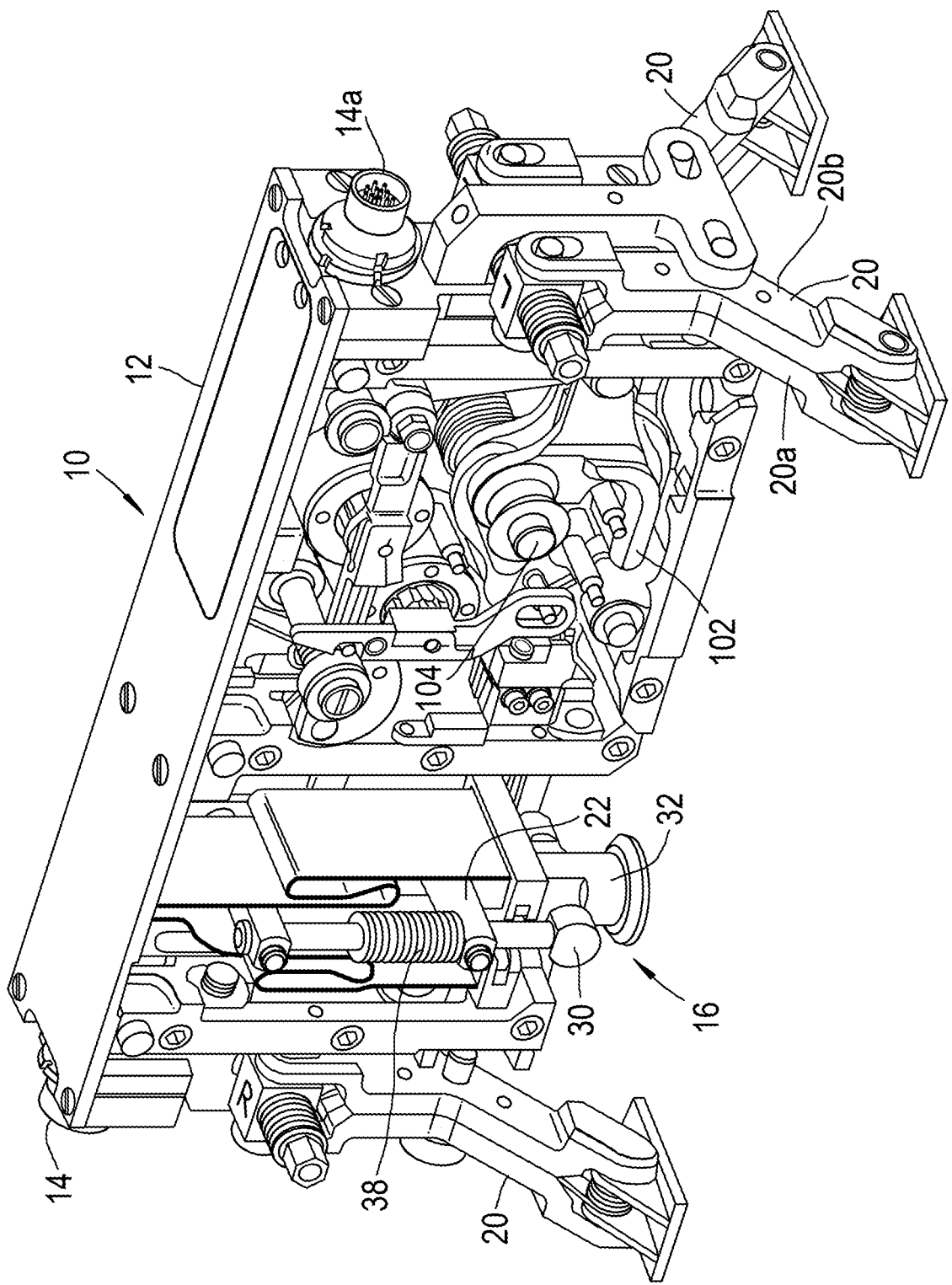
FIGS. 3 and 4 are perspective views corresponding to FIG. 2, viewed from different ends of the suspension and release unit respectively.
Figure 4:
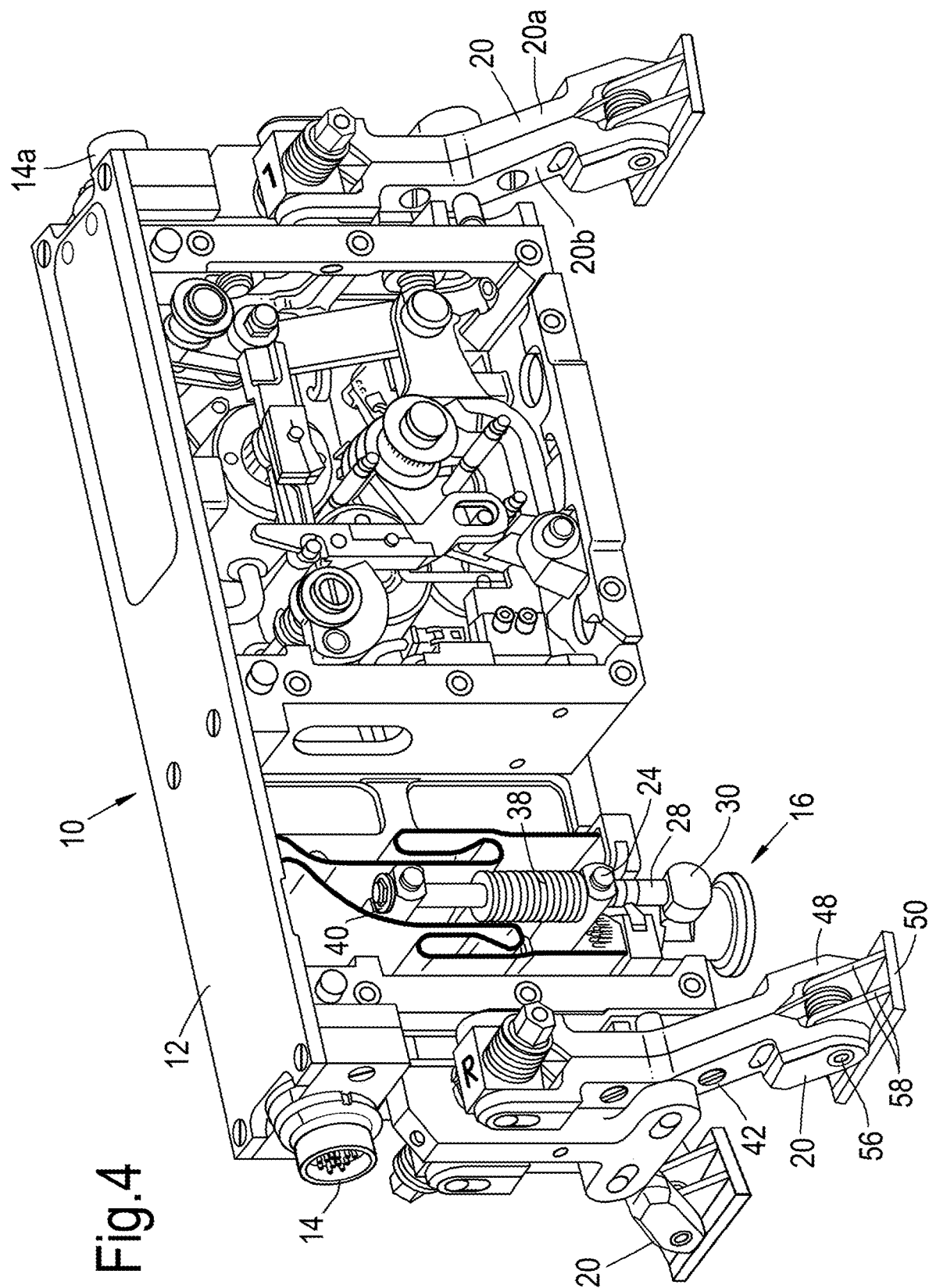
Figure 5:
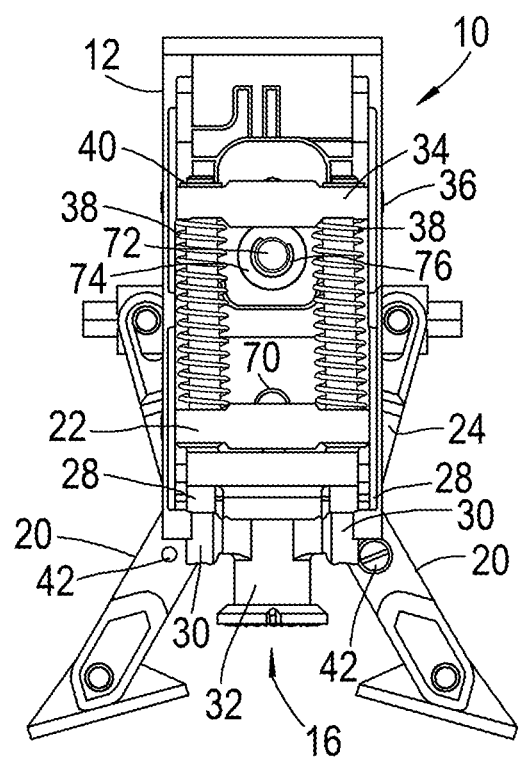
FIG. 5 is a cross-sectional view taken on line V-V in FIG. 2, showing the sway brace legs adjusted to move the feet closest together.
Figure 6A:
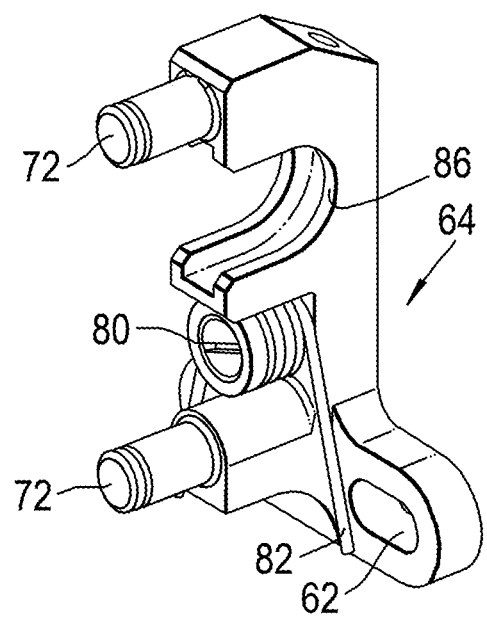
FIG. 6a is a perspective view of a centre bracket.
Figure 6:
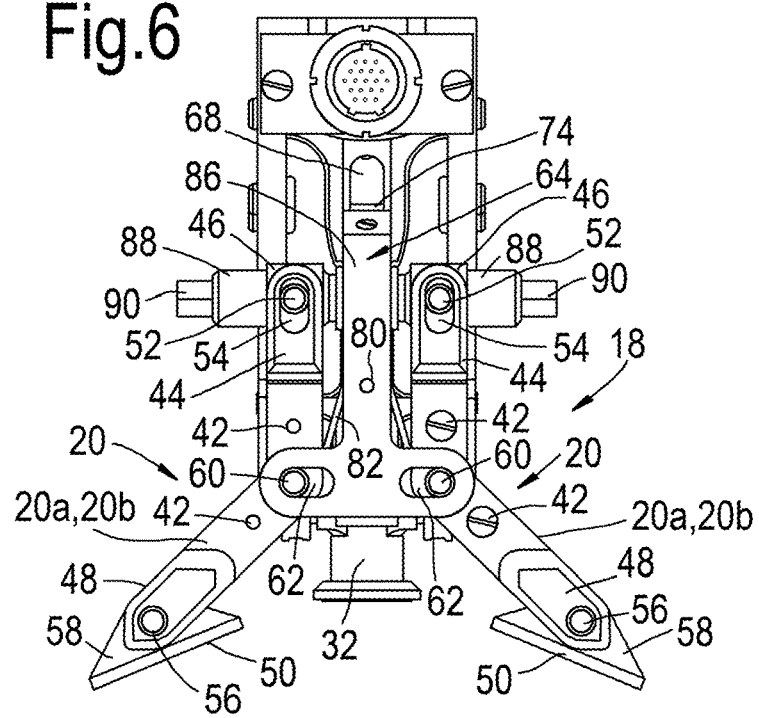
FIG. 6 is an end view in the direction of arrow VI in FIG. 2.
Figure 7:
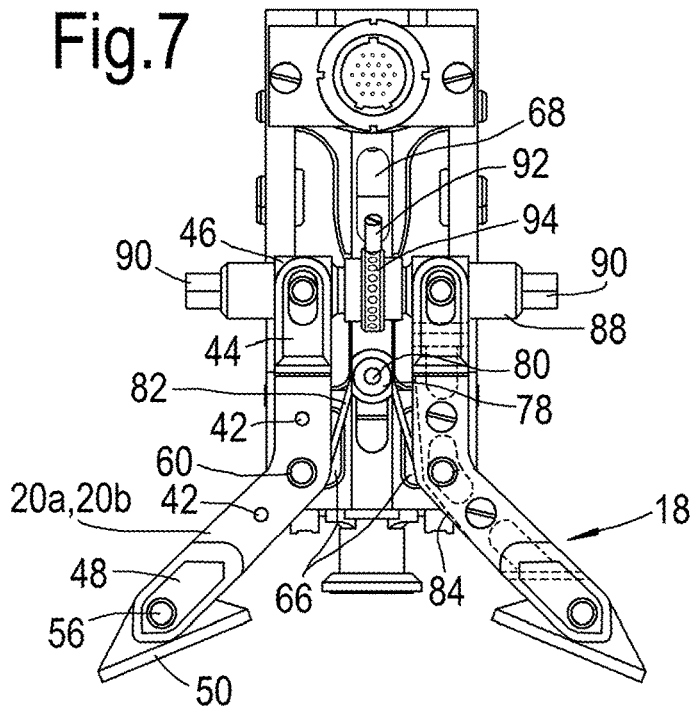
FIG. 7 corresponds to FIG. 6, but shows the center bracket omitted and one sway brace leg ghosted so that other parts can be seen.

The suspension hook 102 and its latching mechanisms are best seen in FIGS. 2-4. In these Figures, the hook is shown in the engaged position, for engaging the suspension lug of a store (not shown). The suspension hook 102 is mounted for rotation on a pivot shaft 104 and is biased towards the disengaged position by a torsion spring 106. The shaft 104 also carries a nib 108 fixed for rotation with the hook 102. When a suspension lug attached to a store (not shown) is inserted through aperture 110 in the body 12 with the hook 102 in its disengaged position, the leading end of the suspension lug encounters the nib 108 and pushes against it, rotating the hook 102 clockwise as viewed in FIG. 2, against the torsion spring bias, to the position shown. In this position, the hook 102 engages through the lug to mechanically couple the store to the suspension and release unit 10.

The primary latch mechanism comprises a rotary solenoid 114, a first rotary arm 116 mounted to the solenoid output shaft, a two-bar "undercentre" linkage 118, a mounting shaft 120, a thrust wheel 124, and a control arm 122 attached to rotate with the hook 102. The upper end of the linkage is rotatably mounted on the shaft 120 and the thrust wheel 124 is rotatably mounted on a pivot shaft connecting the two bars of the linkage 118. The upper bar of the linkage 118 is biased in the clockwise direction about the shaft 120 by a torsion spring 124*a*. The lower end of the linkage 118 is pivotally connected to the distal end of the control arm 122. With the solenoid 114 de-energised, the first rotary arm 116 is spring biased in the anticlockwise direction, to a horizontal rest position as shown in FIG. 2. In this position, the right hand end of the first rotary arm 116 rests against and supports the thrust wheel 124, thereby preventing the linkage 118 from collapsing under the influence of the springs 106, 124*a*. With the safety latch disengaged (as further described below), the first rotary arm 116 is free to be rotated in the clockwise direction by the solenoid 114. This moves the right hand end of the arm 116 out of engagement with the thrust wheel 124, so that the linkage 118 is free to collapse, its upper bar rotating clockwise about the shaft 120, partially under the influence of spring 124*a*. As the linkage collapses, the control arm 122 rotates anticlockwise about the shaft 104, partially under the influence of the spring 106. When the linkage 118 has fully collapsed, the upper bar attains a generally horizontal orientation and the hook 102 is fully disengaged from the store suspension lug, releasing it from the aperture 110. The electrical connector assembly 16 and the sway braces 18 (in particular their feet 50) provide an impulse to the store causing it to separate from the suspension and release unit 10, as described above.

The safety latch mechanism comprises a second rotary solenoid 126, a second rotary arm 128, an icing safety latch 130 and a manual override cam 132. The icing safety latch 130 is mounted for rotation on a shaft 134 and is connected to the second rotary arm 128 by a locking pin 136 received in a drive slot 138. The second rotary arm 128 is resiliently biased anticlockwise to a generally vertical rest position as shown in FIG. 2. In this position, a detent pin 140 on the left hand end of the first rotary arm 116 is held in a notch in the second rotary arm 128, preventing the first rotary arm from rotating. Energising the second solenoid 126 rotates the attached second rotary arm 128 clockwise, disengaging the detent pin 140 from the notch. The first rotary arm 116 is thereby free to rotate when the first solenoid 114 is energised. Clockwise rotation of the second rotary arm 128 also rotates the icing safety latch 130 anticlockwise about the shaft 134, via the pin and slot connection 136, 138. This moves the locking pin 136 out of the path of rotation of the nib 108, so that the hook 102 is free to rotate anticlockwise to its disengaged position. De-energising the second solenoid 126 moves the locking pin 136 back in front of the nib 108 if the hook has jammed, e.g. due to icing. Then if the nib 108 presses against the locking pin 136 attempting to rotate it clockwise about the shaft 134 (e.g. if ice melts to unjam the hook 102) the second rotary arm 128 is biased anticlockwise via the pin and slot connection 136, 138. However the second rotary arm 128 is prevented from rotating anticlockwise by engagement of the pin 140 in the second rotary arm notch. The hook 102 is therefore locked against rotation and prevented from disengaging from the store suspension lug, even if the primary latch mechanism has moved sufficiently so that the first rotary arm 116 right hand end no longer engages the thrust wheel 124 and the linkage 118 has begun to collapse. On the other hand, if the hook 102 rotates properly to the fully disengaged position, the nib 108 now lies clockwise of the locking pin 136. Pushing another store suspension lug through the aperture 110 will rotate the nib 108 clockwise and the locking pin 136 anticlockwise, until the nib passes the locking pin. The locking pin 136 and remainder of the icing safety latch 130 are free to rotate anticlockwise during this procedure, as the second rotary arm 128 is free to rotate clockwise. Clockwise rotation of the nib 130 also engages the hook 102 in the suspension lug and resets the control arm 122 and linkage 118 so that the thrust wheel 124 momentarily displaces and is then supported against the right hand end of the first rotary arm 116.

Rotating the manual override cam 132 approximately 90 degrees anticlockwise from the position shown in FIG. 2, using a screwdriver in the drive slot 134a, displaces the second rotary arm 128 slightly clockwise, forming a detent for the second rotary arm so that the detent pin 140 is released by the second rotary arm 128. The safety latch mechanism is thereby disconnected from the primary latch mechanism, but the icing safety latch 130 remains effective. This is assisted by a degree of lost motion provided in the pin and slot connection 136, 138, whereby the slight clockwise rotation of the second arm 128 arising when the override cam 132 is set, results in little or no anticlockwise rotation of the locking pin 136. Limit switches 136a, 138a are provided to sense the positions of the hook 102 assembly and of the second rotary arm 128.

The invention claimed is:

1. A suspension and release unit for an aircraft, the suspension and release unit comprising a body, a sway brace and a suspension hook, the sway brace and the suspension hook being releasably engageable with a store, the sway brace comprising a pair of adjustable legs, each adjustable leg respectively comprising:
   a foot pivotally attached to the adjustable leg, and
   a spring having a first end coupled to the adjustable leg and a second end coupled to the foot, so that the pivoting of the foot on the adjustable leg is resiliently biased by the spring;
whereby as the legs are brought into engagement with the store, parts of the feet are rotated toward the body so as to preload the springs, and upon release of the suspension hook from the store, the springs rotate said parts of the feet outward away from the body to provide an ejection impulse to the store.

2. A suspension and release unit as defined in claim 1, in which the spring is a mechanical spring.

3. A suspension and release unit as defined in claim 1, in which the adjustable legs are angularly adjustable to bring their feet into resiliently biased engagement with the store.

4. A suspension and release unit as defined in claim 3, in which the angular adjustment of the adjustable legs is provided by a lead screw.

5. A suspension and release unit as defined in claim 4, each leg being provided with a respective drive nut; the lead screw having an oppositely handed thread at each end and the respective drive nuts being mounted one on each of these threads.

6. A suspension and release unit as defined in claim 1, in which the adjustable legs are height adjustable with respect to the suspension hook.

7. A suspension and release unit as defined in claim 6, in which the sway brace may be freed for movement between two different vertical positions by squeezing the pair of adjustable legs together, and upon release of the adjustable legs is automatically locked in the position to which it has been moved.

8. A suspension and release unit as defined in claim 1, in which the spring is a torsion spring.

9. A suspension and release unit as defined in claim 1, in which the sway brace or a portion thereof is additionally power actuated to provide the ejection impulse.

10. A suspension and release unit for an aircraft, comprising a main body having a fixed mounting by which the main body is fixedly attached to an aircraft in use; the suspension and release unit further comprising an electrical connector, the electrical connector in use being engageable with a store and movable under resilient bias which acts between the main body and the electrical connector, so that the resilient bias provides an impulse which ejects the store from the aircraft.

11. A suspension and release unit as defined in claim 10, in which a mechanical spring is used to bias the electrical connector and provide the impulse.

12. A suspension and release unit as defined in claim 10, in which the electrical connector or a portion thereof is power actuated to provide the impulse.

13. A suspension and release unit as defined in claim 10, comprising one or more coil springs which bias the electrical connector in a direction away from the main body.

14. A suspension and release unit for an aircraft, the suspension and release unit comprising a sway brace and a suspension hook engageable with a store, the sway brace comprising an adjustable leg and a foot pivotally attached to the adjustable leg, in which pivoting of the foot is resiliently biased, and the suspension and release unit further comprises a main body and an electrical connector, the electrical connector being engageable with the store and movable under resilient bias which acts between the main body and the electrical connector, wherein the main body is adapted for fixed attachment to an aircraft, so that the resilient bias provides an ejection impulse between the aircraft and the store.

15. A store suspension and release unit, comprising a suspension hook, a primary latch which can be actuated to release the suspension hook for movement, thereby to release a store, and a safety latch movable from a locked position in which it lies in a path of movement of the suspension hook or of parts movable therewith so as to block the movement of the suspension hook, to an unlocked position in which the safety latch lies clear of the path of movement whereby the suspension hook is free to move and release the store;

wherein the safety latch is continuously resiliently biased towards the locked position, and the suspension hook comprises a nib engageable with a distal end of a store suspension lug as a store is offered up to the suspension hook, so as to rotate the suspension hook from a released position to a position in which the suspension hook engages the lug, the safety latch moving into the path of rotation of the nib, whereby if the suspension hook has jammed following the actuation of the primary latch, the safety latch prevents the suspension hook from releasing the store.

16. A store suspension and release unit as defined in claim 15, in which in the locked position the safety latch is engageable with the primary latch to prevent actuation of the primary latch and in the unlocked position the safety latch allows actuation of the primary latch.

17. A store suspension and release unit as defined in claim 16, in which the safety latch comprises a detent to hold it in a partially locked position in which it lies in the path of movement of the suspension hook or of the parts movable therewith, but in which actuation of the primary latch is allowed.

18. A store suspension and release unit as defined in claim 15, in which the safety latch comprises an actuator driven rotary arm having a detent disengageable from the primary latch by operation of the actuator.

19. A store suspension and release unit as defined in claim 18, in which the rotary arm is drivingly coupled to a detent which is movable out of the path of rotation of the nib by operation of the actuator.

* * * * *